United States Patent [19]

Huhn et al.

[11] 4,436,856
[45] Mar. 13, 1984

[54] AQUEOUS ORGANOPOLYSILOXANE EMULSIERS AND A PROCESS FOR TREATING ORGANIC FIBERS THEREWITH

[75] Inventors: Karl Huhn; Heinrich Marwitz, both of Burghausen, Fed. Rep. of Germany

[73] Assignee: Wacker-Chemie GmbH, Munich, Fed. Rep. of Germany

[21] Appl. No.: 346,457

[22] Filed: Feb. 8, 1982

[30] Foreign Application Priority Data

Feb. 10, 1981 [DE] Fed. Rep. of Germany ....... 3104582

[51] Int. Cl.$^3$ ............................................. C08L 83/04
[52] U.S. Cl. ................................ 524/211; 106/287.11; 106/287.12; 106/287.13; 106/287.14; 428/391; 428/447; 524/588; 524/261; 524/838; 525/478
[58] Field of Search .............. 524/588, 838, 211, 261; 252/8.6; 525/478; 106/287.11, 287.12, 287.13, 287.14

[56] References Cited

U.S. PATENT DOCUMENTS 4,098,701  7/1978  Burrill et al. ......................... 252/8.6
4,167,501  9/1979  Rooks ................................. 524/500

Primary Examiner—Theodore E. Pertilla

[57] ABSTRACT

Organic fibers are impregnated with an aqueous emulsion comprising (1) an organopolysiloxane containing diorganosiloxane units in which both organic radicals are monovalent hydrocarbon radicals, and further contains at least two monovalent SiC-bonded organic radicals with a basic nitrogen atom per molecule in which the SiC-bonded organic radicals with a basic nitrogen are present in monoorganosiloxane units, (2) an organopolysiloxane having at least 3 Si-bonded hydrogen atoms per molecule, (3) a catalyst for the condensation of Si-bonded condensable groups (4) emulsifiers, and (5) a diorganopolysiloxane containing an Si-bonded hydroxyl group in each of its terminal units and whose radicals are free of the basic nitrogen atom. If it is desired to impart hydrophobic properties to the impregnated organic fibers, then it is essential that (6) a trimethylsiloxy end-blocked diorganopolysiloxane be added to the aqueous emulsion. Moreover, as the amount of trimethylsiloxy end-blocked diorganopolysiloxane (6) is increased in the emulsion, the hydrophobic properties of the impregnated fibers increases.

10 Claims, No Drawings

AQUEOUS ORGANOPOLYSILOXANE EMULSIERS AND A PROCESS FOR TREATING ORGANIC FIBERS THEREWITH

The present invention relates to aqueous emulsions, particularly to aqueous emulsions which may be used for impregnating organic fibers. More particularly, the invention relates to a process for impregnating fibers with an aqueous emulsion to impart a high degree of elasticity and a predetermined degree of hydrophobicity to the treated organic fibers.

BACKGROUND OF THE INVENTION

Organic fibers have been treated with aqueous emulsions containing polydiorganosiloxanes to impart hydrophobic properties thereto. For example, U.S. Pat. No. 4,098,701 to Burrill et al discloses treating organic fibers with an aqueous emulsion containing (A) an organopolysiloxane containing diorganosiloxane units in which the two organic radicals are monovalent hydrocarbon radicals and further contains at least two monovalent SiC-bonded organic radicals with basic nitrogen for each molecule, (B) an organopolysiloxane having at least three silicon-bonded hydrogen atoms in the molecule and (C) a catalyst for the condensation of Si-bonded condensable groups.

In contrast to the processes known heretofore for treating organic fibers, the process of this invention imparts not only a high degree of elasticity, but also a predetermined degree of hydrophobicity to the treated fibers. Moreover, organic fibers treated in accordance with the process of this invention have a high degree of dimensional stability and are easy to sew. Furthermore, all of the properties imparted to the treated organic fibers by the process of this invention are preserved even when the fibers are washed with water or cleaned with organic solvents.

Therefore, it is an object of this invention to provide an aqueous emulsion for treating organic fibers. Another object of this invention is to provide a process for treating organic fibers with an aqueous emulsion to impart a high degree of elasticity to the treated fibers. Still another object of this invention is to provide a process for imparting a predetermined degree of hydrophobicity to the organic fibers. A further object of this invention is to provide a process for imparting a high degree of dimensional stability to the treated organic fibers.

SUMMARY OF THE INVENTION

The foregoing objects and others which will become apparent from the following description are accomplished in accordance with this invention, generally speaking, by providing a process for impregnating organic fibers with an aqueous emulsion comprising (1) an organopolysiloxane containing diorganosiloxane units in which both organic radicals are monovalent hydrocarbon radicals, and also contains at least two monovalent SiC-bonded organic radicals per molecule with a basic nitrogen atom, in which the SiC-bonded organic radicals containing the basic nitrogen atom of the organopolysiloxane (1) are present in monoorganosiloxane units, (2) an organopolysiloxane having at least 3 Si-bonded hydrogen atoms per molecule, (3) a catalyst for the condensation of Si-bonded condensable groups, (4) an emulsifier, (5) a diorganopolysiloxane containing an Si-bonded hydroxyl group in each of its terminal units, whose organic radicals are free of basic nitrogen atoms, and optionally (6) a trimethylsiloxy end-blocked diorganopolysiloxane having a viscosity of from about 100 to 10,000 mPa.s at 25° C.

DETAILED DESCRIPTION OF THE INVENTION

Any organic fiber which has been or could have been impregnated heretofore with organopolysiloxanes can be impregnated with the aqueous emulsion of this invention.

Such organic fibers may be made of either natural or synthetic fibers. Suitable examples of organic fibers which may be treated by the process of this invention are fibers made of keratin, cotton, rayon, hemp, natural silk, polypropylene, polyethylene, polyester, polyurethane, polyamide, cellulose acetate and mixtures of such fibers. The fibers may be present in the form of fleeces, mats, fabrics, knitted textiles, including articles of clothing or sections of clothing. Except for wool, it is preferred that the fibers be treated in the form of fabrics.

The amount of water present in these aqueous emulsions is not critical. It is, however, preferred that the total amount of water, in which the non-aqueous constitutents are dissolved or dispersed, range from about 35 to 90 percent by weight and more preferably from about 45 to 60 percent by weight, based on the total weight of the aqueous emulsion. These aqueous emulsions may be further diluted with water prior to application so that the amount of water will range from 60 to 99 percent by weight and more preferably from 80 to 95 percent by weight based on the total weight of the aqueous emulsion applied to the fabric.

The diorganosiloxane units present in the organopolysiloxane (1) may be represented by the general formula

$R_2SiO$, in which R represents the same or different monovalent hydrocarbon radicals; preferably, having from 1 to 20 carbon atoms per radical. Examples of hydrocarbon radicals which may be present in the diorganosiloxane units of organopolysiloxane (1) are alkyl radicals, such as the methyl, ethyl, n-propyl and isopropyl radicals, as well as the butyl, octyl, tetradecyl and octadecyl radicals; alkenyl radicals such as the vinyl and the allyl radicals, as well as the hexenyl radicals; cycloaliphatic hydrocarbon radicals, such as the cyclopentyl and the cyclohexyl radicals; aromatic hydrocarbon radicals such as the phenyl and the naphthyl radicals; alkaryl radicals such as the tolyl radicals and aralkyl radicals such as the benzyl radical. Because of their availability, it is preferred that at least 80 percent of the number of hydrocarbon radicals in the diorganosiloxane units of organopolysiloxane (1) be methyl radicals.

The monoorganosiloxane units and the SiC-bonded organic radicals having a basic nitrogen atom which are present in the organopolysiloxane (1), may be represented by the following general formula

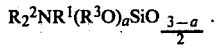

$R_2^2NR^1(R^3O)_aSiO_{\frac{3-a}{2}}$.

In the above formula $R^1$ represents a bivalent hydrocarbon radical, $R^2$ represents hydrogen or the same or different alkyl or aminoalkyl radicals, $R^3$ represents the same or different alkenyl radicals having from 1 to 4 carbon atoms per radical, and a is 0, 1 or 2.

Examples of preferred bivalent hydrocarbon radicals represented by $R^1$ are the methylene and the ethylene radicals, as well as the propylene, butylene, cyclohexylene, octadecylene, phenylene and butenylene radicals. Because of its availability, the n-propylene radical is the preferred radical.

The examples cited for the alkyl radicals represented by R are equally applicable to the alkyl radicals represented by $R^2$. It is preferred that at least one $R^2$ be hydrogen. Examples of suitable aminoalkyl radicals are those of the general formulas:

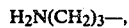
$H_2N(CH_2)_3-$,

$H_2N(CH_2)_2NH(CH_2)_3-$,

$H_2N(CH_2)_2-$,

$(H_3C)_2N(CH_2)_2-$,

$H_2N(CH_2)_5-$,

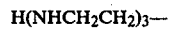
$H(NHCH_2CH_2)_3-$

$C_4H_9NHCH_2CH_2NHCH_2CH_2-$.

Examples of preferred alkyl radicals represented by $R^3$ are the methyl, the ethyl and the isopropyl radicals.

It is preferred that the organopolysiloxanes (1) of this invention have a viscosity of from 10 to 1,000 mPa.s at 25° C., and more preferably from about 20 to 100 mPa.s at 25° C. It is possible to use only one type of organopolysiloxane (1), or a mixture of two or more different types of organopolysiloxane (1) may be used.

The organopolysiloxane (1) is preferably used in an amount of from about 0.4 to 4 parts by weight for each 10 to 90 parts by weight of the diorganopolysiloxane (5) which contains an Si-bonded hydroxyl group in each of its terminal units.

In the process of this invention it is possible to use as organopolysiloxanes (2) having at least 3 Si-bonded hydrogen atoms per molecule, the same organopolysiloxanes containing at least 3 Si-bonded hydrogen atoms per molecule, which has been or could have been used in all of the processes known heretofore for impregnating fibers with aqueous emulsions.

In the organopolysiloxanes (2) having at least 3 Si-bonded hydrogen atoms per molecule, the silicon valences which are not saturated with hydrogen and siloxane-oxygen atoms, are preferably saturated by methyl, ethyl or phenyl radicals or a mixture containing at least two such radicals.

The preferred organopolysiloxanes (2) having at least 3 Si-bonded hydrogen atoms per molecule are those of the general formula

$(CH_3)_3SiO(SiR_2^4O)_pSi(CH_3)_3$, where $R^4$ represents hydrogen or methyl, ethyl or phenyl radicals, and p is an integer having a value of from 10 to 500, with the proviso that only one hydrogen atom may be bonded to each silicon atom and the ratio of $R_2^4SiO$ units wherein both $R_4$s are hydrocarbon radicals, to the $R^4HSi$ units, in which $R^4$ is a hydrocarbon radical, must be between 3:1 and 1:4. Also, it is preferred that $R^4$ be methyl when it is not hydrogen.

The organopolysiloxanes (2) having at least 3 Si-bonded hydrogen atoms per molecule may contain the same or different molecules of this type of organopolysiloxane.

The organopolysiloxane (2) having at least 3 Si-bonded hydrogen atoms per molecule is preferably used in an amount of from 1.2 to 12 parts by weight for each 10 to 90 parts by weight of the diorganopolysiloxane (5).

In this invention, it is possible to use as condensation catalysts (3) any catalysts which have been or could have been used heretofore in an aqueous emulsion for the condensation of Si-bonded condensable groups. Preferred examples of such catalysts are carboxylic acid salts of tin or zinc in which hydrocarbon radicals may be bonded directly to such metals. Suitable examples of condensation catalysts (3) are dibutyltin dilaurate, tin octoate, di-2-ethylhexyltin dilaurate, di-n-butyltin di-2-ethylhexoate, di-2-ethylhexyltin di-2-ethylhexoate and zinc octoate. Additional examples of the condensation catalysts (3) are alkoxy titanates, such as butyl titanate and triethanolamine titanates, as well as zirconium compounds.

Only one type of condensation catalyst (3), need be used; however, a mixture consisting of at least two different types of condensation catalyst (3), may be used, such as for example, a mixture containing a dibutyltin dilaurate and butyl titanate.

The condensation catalyst (3) is preferably employed in an amount of from about 0.3 to 6 parts by weight for each 10 to 90 parts by weight of the diorganopolysiloxane (5).

When it is desired to impart a high degree of hydrophobicity to an impregnated textile material by this invention, then it is preferred that at least a part of the emulsifier (4) contain an organosiloxane-oxyalkylene-block copolymer, in which the polyoxyalkylene block, or blocks are bonded to the organopolysiloxane block or blocks through an SiOC bond (4a). Preferred examples of such block copolymers (4a) are those consisting of dimethylpolysiloxane and polyoxyethylene or polyoxyethylene glycol. As the proportion of such block copolymers (4a) in the emulsifier (4) is increased, the degree of hydrophobicity imparted to the impregnated fibers likewise increases. Emulsifiers other than the organosiloxane-oxyalkylene-block copolymers (4a) having SiOC bonds, which have been or could have been used heretofore in emulsifying organopolysiloxanes in water may be used in this invention. Examples of such emulsifiers (4b) are non-ionic emulsifiers, such as alkanol or phenol polyglycol ethers, or alkylphenols, such as polyoxyethylene alkylphenols, polyoxyethylene sorbitan hexastearate, polyoxyethylene isotridecylether, trimethyl nonyl ether of polyethylene glycol, containing from 6 to 14 ethylene oxide units per molecule, polyoxyethylene sorbitan oleate having a saponification number of from 102 to 108 and a hydroxyl number of from 25 to 35, and anionic emulsifiers such as sodium alkylarylpolyethylene glycol sulfonate.

The organosiloxane-oxyalkylene block copolymer (4a) having an SiOC bond is preferably used in an amount of from 0 to 20 parts by weight for each 10 to 90 parts by weight of diorganopolysiloxane (5).

The emulsifiers (4b), other than the organosiloxaneoxyalkylene copolymer (4a) having an SiOC bond, are preferably used in an amount of from 0 to 20 parts by weight for each 10 to 90 parts by weight of diorganopolysiloxane (5).

It is preferred that the sum of the emulsifiers (4a) and (4b) be at least 5 parts by weight for each 10 to 90 parts by weight of the diorganopolysiloxane (5).

Also, the preferred diorganopolysiloxanes (5) having an Si-bonded hydroxyl group in each of their terminal units and whose organic radicals are free of basic nitrogen atoms, can be represented by the following general formula HOSiR$_2$O(SiR$_2$O)$_n$H, in which R is the same as above and n is an integer having a value such that the average viscosity of these diorganopolysiloxanes (5) ranges from about 500 to 50,000 mPa.s at 25° C. The examples cited for the R radicals of the diorganosiloxane units in the organopolysiloxane (1) are equally applicable to the organic radicals of the organopolysiloxane (5).

It is preferred that the viscosity of the organopolysiloxane (5) be from 2,000 to 10,000 mPa.s at 25° C.

It is preferred that the sum of the constituents (1) through (5) within the above parameters, amount to 100 parts by weight.

If it is desired to use the process of this invention to impart hydrophobic properties to impregnated fibers, then it is preferred that still another substance be utilized in this invention, namely a trimethylsiloxy end-blocked diorganopolysiloxane (6) which has a viscosity of from 100 to 10,000 mPa.s at 25° C. and more preferably from 300 to 1,000 mPa.s at 25° C. The examples cited for the R radicals of the diorganosiloxane units in organopolysiloxane (1) are equally applicable to the organic radicals of the diorganosiloxane units of the organopolysiloxanes (6).

Preferably the trimethylsiloxy end-blocked diorganopolysiloxane (6) which has a viscosity of from 100 to 10,000 mPa.s at 25° C. is used in an amount of from about 0 to 90 parts by weight for each 10 to 90 parts by weight of the diorganopolysiloxane (5). Moreover, it is preferred that when the diorganopolysiloxane (6) is used in the emulsion that the constituents (1) through (6), be used within the above parameters and that their sum amount to 100 parts by weight. The hydrophobic properties of the fibers impregnated in accordance with the process of this invention increases as the amount of the trimethylsiloxy end-blocked diorganopolysiloxane (6) increases.

The so-called "crease-resistant compounds or finishes" such as dimethyldihydroxyethylene urea (DMDHEU) containing zinc nitrate, may also be used in the compositions of this invention, especially when the fibers to be impregnated contain cellulose or cotton fibers or mixtures of cellulose and cotton fibers.

In order to prevent premature crosslinking of the emulsions, it is preferred, where applicable, that emulsions containing organopolysiloxanes (1), (5) and (6), be prepared separately from the emulsions containing the organopolysiloxane having Si-bonded hydrogen (2), and the emulsions containing condensation catalyst (3) and that the resultant emulsions containing the three different components be maintained separately until just prior to their intended use, at which time they should be mixed and, if necessary, diluted with water and applied to the fibers.

The emulsions of this invention may be applied to the fibers by any of the methods generally used for impregnating fibers with liquids, for example by immersion, coating, pouring, spraying, including aerosol spraying, rolling or padding.

It is preferred that the emulsions of this invention be applied in an amount such that after the water has evaporated, the fibers will increase in weight from about 1 to 20 percent by weight based on the original weight of the fibers.

The crosslinking or curing of the impregnated fibers takes place at room temperature, however, it can be accelerated by heating the fibers to, for example, between about 50° and 180° C.

Fibers which have been rendered hydrophobic by the process of this invention are for example, useful in manufacturing rainwear. When the aqueous emulsion of this invention is used to impregnate keratin, it prevents or reduces shrinkage due to felting. Moreover, it imparts a soft and elastic feel to keratin, especially wool, which has been pretreated with chlorine, rinsed and neutralized in accordance with the procedure described in Belgium Pat. No. 651,439.

In the following examples, all parts and percentages are by weight unless otherwise specified.

EXAMPLE 1

A cotton fabric is immersed in an aqueous emulsion containing the following ingredients in addition to water:

- 72 parts of a dimethylpolysiloxane having an Si-bonded hydroxyl group in each of its terminal units in which the dimethylpolysiloxane has a viscosity of 5,000 mPa.s at 25° C.;
- 3 parts of a product obtained from the reaction of a dimethylpolysiloxane containing an Si-bonded hydroxyl group in each of its terminal units and having a viscosity of 100 mPa.s at 25° C., with a silane of the formula H$_2$N(CH$_2$)$_2$NH(CH$_2$)$_3$Si(OCH$_3$)$_3$, in which the reaction product has a viscosity of 40 mPa.s at 25° C. and an amine number of 3 as determined by the milliliters of 1 N HCl required to neutralize one gram of substance;
- 11 parts of a trimethylsiloxy end-blocked organopolysiloxane which consists of 75 mol percent of dimethylsiloxane units and 25 mol percent of methylhydrogen siloxane units and having a viscosity of 130 mPa.s at 25° C.;
- 6 parts of di-2-ethylhexyltin dilaurate;
- 8 parts of an alkanol polyglycol ether obtained from the reaction of isotridecanol with ethylene oxide in a mol ratio of 1:10;
- 150 parts of dimethyldihydroxyethylene urea (DMDHEU);
- and 56 parts of zinc nitrate; with such an amount of water in the emulsion, that 150 parts of DMDHEU are corresponding to a concentration of 4 percent in the emulsion. The fabric is squeezed until the amount of liquid absorbed is equal to 100 percent of the weight of the fabric and then heated to 150° C. for 10 minutes.

The impregnated fabric thus obtained has a soft, elastic feel or "hand" which is preserved even after the fabric has been laundered several times in an automatic washer at a temperature of 30° C. The fabric is essentially non-hydrophobic.

EXAMPLE 2

A fabric consisting of 35 percent cotton and 65 percent polyester is immersed in an aqueous emulsion containing the following ingredients in addition to water:

- 38 parts of a dimethylpolysiloxane containing an Si-bonded hydroxyl group in each of its terminal units and having a viscosity of 5,000 mPa.s at 25° C.;
- 41 parts of a trimethylsiloxy end-blocked dimethylpolysiloxane having a viscosity of 350 mPa.s at 25° C.;
- 2 parts of the reaction product described in Example 1, in which a dimethylpolysiloxane having an Si-bonded hydroxyl group in each of its terminal units is reacted with a silane of the formula $H_2N(CH_2)_2NH(CH_2)_3Si(OCH_3)_3;$

- 6 parts of the organopolysiloxane described in Example 1 having Si-bonded hydrogen;
- 2 parts di-2-ethylhexyltin dilaurate;
- 8 parts of a dimethylsiloxane-oxyethylene-block copolymer in which the polyoxyethylene block is bonded to the dimethylpolysiloxane block by an SiOC bond, wherein the mole ratio of dimethylsiloxane units to ethylene oxide units is about 1:6.5 and the viscosity of the block copolymer is about 250 mPa.s at 25° C.;
- 3 parts of the polyethylene glycol ether of isotridecanol, described in Example 1;
- 150 parts of dimethyldihydroxyethylene urea (DMDHEU);
- and 56 parts zinc nitrate;

with such an amount of water in the emulsion, that 150 parts of DMDHEU correspond to a concentration of 4 percent in the emulsion. The fabric is squeezed until the amount of fluid absorbed is equal to 100 percent of the weight of the fabric and heated for 10 minutes to 150° C.

The impregnated fabric thus obtained has a soft and elastic feel and even after it has been laundered 5 times at 30° C. in an automatic washer, the feel or "hand" is preserved.

The fabric's water-repellency is tested in accordance with the so-called "Spray Test" (AATCC 22-1967). The following values are obtained:

| Number of washings at 30° C. | 0 | 1 | 3 | 5 |
|---|---|---|---|---|
| Spray Test factor | 100 | 100 | 100 | 80 |

EXAMPLE 3

The procedure described in Example 2 is repeated, except that the dimethyl-dihydroxyethylene urea (DMDHEU), and zinc nitrate is omitted from the emulsion. Also, the amount of dimethylpolysiloxane containing an Si-bonded hydroxyl group in each of its terminal units corresponds to a concentration of 1.9 percent in the emulsion. A wool fabric weighing approximately 400 g/m² is substituted for the cotton-polyester mixed fabric and immersed in the emulsion.

The impregnated fabric thus obtained has dimensional stability and has a soft and elastic feel. Its water repellency potential in accordance with AATCC 22-1967 is approximately 90. All of these properties remain essentially unaltered even after five washings in an automatic household washer at 30° C.

EXAMPLE 4

The procedure described in Example 2 is repeated, except that the dimethyldihydroxyethylene urea (DMDHEU), and zinc nitrate has been omitted from the emulsion. The amount of dimethylpolysiloxane containing an Si-bonded hydroxyl group in each of its terminal units corresponds to a concentration of 1.2 percent in the emulsion, and a polyester knit is substituted for the cotton-polyester mixed fabric.

The impregnated fabric obtained has stable dimensions and a soft and elastic feel. Its water repellency in accordance with test AATCC 22-1967 is between 90 and 100. All of these properties remain practically unaltered even after 5 washings in an automatic washer at 30° C.

EXAMPLE 5

A polyester knit is immersed in an aqueous emulsion containing the following ingredients in addition to water:

- 32 parts of a dimethylpolysiloxane containing an Si-bonded hydroxyl group in each of its terminal units and having a viscosity of 5,000 mPa.s at 25° C.;
- 24 parts of a trimethylsiloxy end-blocked dimethylpolysiloxane having a viscosity of 350 mPa.s at 25° C.;
- 2 parts of the reaction product described in Example 1, in which a dimethylpolysiloxane having an Si-bonded hydroxyl group in each of its terminal units is reacted with a silane of the formula $H_2N(CH_2)_2NH(CH_2)_3Si(OCH_3)_3;$

- 8 parts of the organopolysiloxane described in Example 1 having Si-bonded hydrogen atoms;
- 4 parts of di-2-ethylhexyltin dilaurate;
- 4 parts of the dimethylsiloxane-oxyethylene-block copolymer described in Example 2;
- and 6 parts of the polyethylene glycol ether of isotricanol described in Example 1;

with such an amount of water in the emulsion, that 32 parts of dimethylpolysiloxane containing an Si-bonded hydroxyl group in each of its terminal units correspond to a concentration of 1.7 percent in the emulsion. The fabric is squeezed until the amount of fluid absorbed is equal to 100 percent of the weight of the fabric and then heated to 150° C.

The properties of the impregnated fabric are the same as those of the knit treated in accordance with Example 4, except that the water-repellency as measured in accordance with test AATCC 22-1967 is only 80. The degree of water-repellency is unaltered even after 5 washings in an automatic washer at 30° C.

What is claimed is:

1. An aqueous emulsion for impregnating organic fibers comprising (1) an organopolysiloxane having diorganosiloxane units in which both organic radicals are monovalent hydrocarbon radicals, and at least two monovalent SiC-bonded organic radicals having a basic nitrogen atom per molecule, in which the SiC-bonded organic radicals having a basic nitrogen atom are present in monoorganosiloxane units; (2) an organopolysiloxane with at least 3 Si-bonded hydrogen atoms per molecule; (3) a catalyst for the condensation of Si-bonded condensable groups; (4) an emulsifier selected from the group consisting of an organosiloxane-oxyalkylene block copolymer in which the oxyalkylene block is bonded to the organosiloxane block through an SiOC bond, a nonionic emulsifier, an anionic emulsifier and mixtures thereof; and (5) a diorganopolysiloxane having an Si-bonded hydroxyl group in each of its terminal units and whose organic radicals are free of nitrogen.

2. The emulsion of claim 1, wherein the aqueous emulsion contains (6) a trimethylsiloxy end-blocked diorganopolysiloxane having a viscosity of from 100 to 10,000 mPa.s at 25° C.

3. The emulsion of claim 1, wherein the organopolysiloxane (1) is present in an amount of from 0.4 to 4 parts by weight for each 10 to 90 parts by weight of the diorganopolysiloxane (5).

4. The emulsion of claim 1, wherein the organopolysiloxane (2) is present in an amount of from 1.2 to 12 parts by weight for each 10 to 90 parts by weight of the diorganopolysiloxane (5).

5. The emulsion of claim 1, wherein the catalyst is present in an amount of from 0.3 to 6 parts by weight for each 10 to 90 parts by weight of the diorganopolysiloxane (5).

6. The emulsion of claim 2, wherein the diorganopolysiloxane (6) is present in an amount up to 90 parts by weight for each 10 to 90 parts by weight of the diorganopolysiloxane (5).

7. The emulsion of claim 1, wherein the aqueous emulsion also contains dimethyldihydroxyethylene urea and zinc nitrate.

8. The emulsion of claim 1, wherein the emulsifier (4) is an organosiloxane-oxyalkylene block copolymer in which the oxyalkylene block is bonde to the organosiloxane block through an SiOC bond.

9. The emulsion of claim 1, wherein the emulsifier (4) is a mixture consisting of an organosiloxane-oxyalkylene block copolymer in which the oxyalkylene block is bonded to the organosiloxane block through an SiOC bond and a nonionic emulsifier.

10. The emulsion of claim 1, wherein the emulsifier is present in an amount of at least 5 parts by weight for each 10 to 90 parts by weight of diorganopolysiloxane (5).

* * * * *